United States Patent [19]

Townsend et al.

[11] Patent Number: 5,099,472
[45] Date of Patent: Mar. 24, 1992

[54] HANDS FREE TELECOMMUNICATION APPARATUS AND METHOD

[75] Inventors: Bruce L. Townsend, Kanata; Stephen R. Saunders, Nepean, both of Canada

[73] Assignee: Northern Telecom Limited, Montreal, Canada

[21] Appl. No.: 515,143

[22] Filed: Apr. 26, 1990

[30] Foreign Application Priority Data

Oct. 24, 1989 [CA] Canada .................... 2001277

[51] Int. Cl.$^5$ ............................ H04M 1/60
[52] U.S. Cl. ................... 370/32.1; 379/390; 379/411
[58] Field of Search ............ 370/32.1; 379/388, 390, 379/406, 410, 411, 389

[56] References Cited

U.S. PATENT DOCUMENTS 2,696,529 12/1954 Bachelet et al. .
2,702,319 2/1955 Ryall .
3,889,059 6/1975 Thompson et al. .
4,225,754 9/1980 Bernard et al. .
4,578,543 3/1986 LeBourlot et al. .
4,989,242 1/1991 Arnaud .................. 370/32.1
5,007,046 4/1991 Erving et al. .............. 370/32.1

Primary Examiner—Benedict V. Safourek
Assistant Examiner—Melvin Marcelo
Attorney, Agent, or Firm—J. E. Moorhouse

[57] ABSTRACT

In a hands free communications terminal apparatus, a loudspeaker and a microphone are permitted to be simultaneously active. A controller monitors signals in transmit and receive paths to direct operations of transversal filters to provide two echo canceller functions, one for the microphone and one for a telephone line so that most unwanted echo and feedback is removed, to prevent the howling and squealing sounds that commonly occur when the loudspeaker and the microphone are both active. Remaining echoes are removed by voice switching of loss between transmit and receive paths, wherein the amount of loss is determined in response to characteristics of the telephone line and the operating environment of the terminal apparatus.

15 Claims, 2 Drawing Sheets

HANDS FREE TELECOMMUNICATION APPARATUS AND METHOD

FIELD OF THE INVENTION

The invention is in the field of audible telecommunications and particularly relates to hands free telecommunications and hands free telecommunication instruments, sometimes referred to as loudspeaking telephones or speakerphones.

BACKGROUND OF THE INVENTION

The majority of audible telecommunications are carried on by means of telephone instruments which include a hand set with a microphone and an earphone. The microphone transmits audible voice utterances from a user toward a transmission medium and the earphone produces audible sounds in response to signals from the transmission medium. Hence the microphone is often referred to as a transmitter and the earphone is often referred to as a receiver. The transmitter is coupled with a transmit path via a pair of wires and the receiver is coupled with a receive path via another pair of wires. The transmitter and the receiver are spaced apart in the hand set such that in normal use any acoustical energy coupled from the transmit path to the receive path via the transmitter and the receiver is insignificant. Although the majority of telephone calls are conducted exclusively with hand sets, there are instances where the requirement of having to hold the hand set adjacent ones mouth and ear is sufficiently inconvenient to encourage the usage of a loudspeaking telephone wherein signals are amplified at the receiver to be widely audible and the transmitter is of greater sensitivity to be able to pick up the user's voice at a distance. Consequently, acoustical energy coupled from the transmit path to the receive path via the transmitter and the receiver is sufficient to induce singing, were it not for additional means such as voice switchers or echo cancellers used in the typical loudspeaking telephone. If the loudspeaking telephone is coupled with a bidirectional two wire telephone line, such coupling is by way of a hybrid circuit which being far from perfect, may exacerbate the singing problem. Nevertheless each of these means introduces side effects or fails to perform sufficiently well to make the technology of hands free telephony desirably unobtrusive.

Design efforts to achieve unobtrusive voice switching have spanned many decades. For example, A. E. Bachelet et al in U.S. Pat. No. 2,696,529, titled "Voice Operated Switching System" and issued on Dec. 7, 1954, taught a voice switch, having a relay being controlled in response to signal energies for selectively coupling transmit and receive information signals between a four wire system and a half-duplex transmission medium. Shortly thereafter, L. E. Ryall in U.S. Pat. No. 2,702,319, titled "Two-Way Telecommunication System" issued on Feb. 15, 1955, discussed requirements of a voice switching system as being:

(a) Rapid operation of the switches so as to minimize the initial increment of voice energy lost in switching;

(b) A delay or hangover in restoring to normal, sufficiently long to give continuity of speech between syllables and to suppress reverberation or echo;

(c) Facility for either party to break in during the hangover time;

(d) A hangover time which does not vary unduly with variations in signal strength; and (e) Protection of each signal path from the effects of signal leakage between them or acoustic coupling between them.

Twenty years of technological advance and design evolution toward optimally meeting these requirements are exemplified by J. L. E. Thompson et al in their U.S. Pat. No. 3,889,059 titled "Loudspeaking Communication Terminal Apparatus And Method Of Operation" issued on June 10, 1975, and assigned to Northern Electric Company Limited. In spite of the use of highly developed analog discreet and integrated solid state circuit components, arranged in circuits, tailored to optimize the performance of these requirements in the speakerphone, the presence of the voice switch continued to be obtrusive. One of the obtrusive characteristics is apparently associated with the rate and an amount of loss which must be switched to alternate between receive and transmit modes of operation. Realizing this, Thompson et al introduced an idle mode of operation, intermediate the transmit or receive modes of operation. The idle mode of operation became effective in the absence of significant speech sound after a short hangover time, whereby a lesser amount of loss is switched to enter the transmit or receive modes. Furthermore the voice switch was restrained from fully entering the transmit mode in accordance with a presence of monotonous sounds which are characteristic of background noise and uncharacteristic of speech. Typically in Thompson et al's method, a transition to either the transmit mode or to the receive mode is frequently achieved with less than the full amount of loss being switched The resultant operation of the voice switch was sufficiently unobtrusive that a hands free telephone of this general design became a moderate commercial success. Succeeding designs have largely replaced the analog circuit elements of the voice switch with digital devices and a digital controller, which together execute the voice switching functional requirements with precisely tailored consistency and reduced obtrusiveness. However in all but the most favorable conditions in a telephone call, one party making use of a typical telephone handset will be aware of an unpleasant feeling of, from time to time, being momentarily cut off if the other party is using a voice switching speakerphone.

The availability of digital circuits at relatively low cost may have encouraged S. Bernard et al to attempt to avoid the inherent obtrusiveness of voice switching by an alternate arrangement which includes transversal filters adapted to perform echo cancelling functions for sounds coupled between the transmit and receive paths. It is known that acoustical energies from the loudspeaker, sufficient to contribute to singing, tend to be dissipated and become insignificant, after traversing distances of twenty feet or so, that is with a time delay in excess of about twenty milliseconds. It is further known that significant electrical analog signal energies may be leaked across a hybrid circuit, usually with a delay of not more than about eight milliseconds. In their U.S. Pat. No. 4,225,754, titled "Loudspeaker Telephone" and issued on Sept. 30, 1980, Bernard et al teach a first transversal filter for synthesizing an acoustic echo signal which is subtracted from the microphone signal with the objective of delivering a substantially echo-free signal to the transmit channel. Likewise, a second transversal filter synthesizes an electric echo signal to deliver a substantially echo-free signal to the reception channel. Practical embodiments have achieved speakerphone operation, without singing, but operation is often obtrusive because of reverberant echoes for which the first transversal filter is not effective.

In U.S. Pat. No. 4,578,543, titled "Digital Echo Canceller" issued on Mar. 25, 1986, Jean Le Bourlot and Michael Levy improve upon this situation by offering an echo canceller provided by a digital non-recursive time domain transversal filter which is effective over twice the time of practical prior filters. However, Le Bourlot et al are merely exemplary of attempts to provide practical transversal filters with extended echo cancellation capabilities. Attempts to provide adequate echo cancellation through typical reverberation times associated with hands free telephony have been plagued with problems such as; poor discrimination of low energy speech signals in the presence of background noise, exaggerations of quantitization distortion, and noticeably slow rates of initial adaptation convergence. In particular some attempts to hasten the rate of convergence have lead to instabilities resulting in divergence, sufficient to cause singing.

It is an object of the invention to provide for hands free communications while substantially avoiding undesirable operating side effects of echo cancellers and of voice switches.

SUMMARY OF THE INVENTION

A hands free communications terminal apparatus in accordance with the invention, includes both a voice switch and an echo canceller, wherein the echo canceller is predominantly functional to prevent singing by reducing the effects of short delay acoustical coupling in the operating environment and the voice switch is predominantly functional to substantially reduce the effects of longer delay acoustical coupling, that is, echoes which would otherwise be perceived as obtrusive by a far end party.

In operation of one example of the hands free communications terminal apparatus, a loudspeaker and a microphone are permitted to be simultaneously active. Two echo cancellers, one for the microphone and one for a telephone line remove most unwanted echo and feedback, to prevent the howling and squealing sounds that commonly occur when the loudspeaker and the microphone are both active. Remaining echoes are removed by voice switching of loss between transmit and receive paths, wherein the amount of loss is determined in response to characteristics of the telephone line and the operating environment of the terminal apparatus.

The invention provides, a hands free communication terminal apparatus including a receive path with a loudspeaker, for coupling signals from a far end party via a transmission medium to the loudspeaker, and a transmit path with a microphone for coupling signals from a near end user via the microphone to the transmission medium. The hands free communication terminal apparatus further comprises a voice switch including a receive variable attenuator being connected in series with the receive path and a transmit variable attenuator being connected in series with the transmit path, the variable attenuators being operable to effect switchable transmit and receive modes of operation. A first echo canceller is connected between the transmit and receive paths and is adaptive to respond to signals in the receive path for reducing amplitudes of corresponding delayed signals from the microphone in the transmit path, and a controller is responsive to signals in the transmit and receive paths for adapting the operation of the echo canceller and is responsive to signals from the echo canceller in the transmit path and to signals in the receive path, for switching the voice switch between receive and transmit modes of operation.

The invention also provides a method for operating a hands free communication terminal apparatus, which has a receive path with a loudspeaker for coupling signals from a far end party via a transmission medium to the loudspeaker and a transmit path with a microphone for coupling signals from a near end user via the microphone to the transmission medium. In accordance with the invention the method comprises the steps of:

echo cancelling signals from the microphone in the transmit path in response to signals, in the receive path for reducing delayed appearances of said signals in the transmit path to produce echo cancelled signals in the transmit path;

in response to signals in the transmit an receive path, adapting the step of echo cancelling whereby reduction of said delayed appearances of said signals in the transmit path is limited to signal appearances of short delay and whereby the reduction is sufficient to avoid singing; and in response to signals from the echo canceller in the transmit path and to signals in the receive path, switching a receive variable attenuator and a transmit variable attenuator in a complementary manner between receive and transmit modes of operation.

Also in accordance with the invention, an amount of loss through which the voice switch is operable is variable at a subsonic rate in response to longer delayed echoes in the transmit path, whereby the amount of switched loss is reduced toward the long term delayed echoes becoming perceptible to the far end party and away from the operation of the voice switch being perceptible to either of the near end user and the far end party.

In one example a hands free telecommunications instrument comprises a receive path for carrying binary information signals received from a transmission medium, to a loudspeaker via an output terminal and a transmit path for carrying binary information signals transmitted from a microphone, to the transmission medium via an input terminal. A voice switch means includes transmit and receive variable attenuators within the transmit and receive paths respectively, for passing the received and transmitted information signals with variable attenuation. A controller is responsive to relative strengths of the received and transmitted information signals for controlling the transmit and receive variable attenuators to impede the information signals traversing either one of the variable attenuators by a set amount of attenuation. A summing means with first and second inputs and an output is connected in series between the input of the input of the transmit path and the transmit variable attenuator via the first input and the output respectively. A transversal filter includes an input connected to the receive path and an output connected to the second input of the summing means, and in combination with the summing means is operable as directed by the controller and in response to the information signals in the receive path, for reduce signal strengths resulting from a substantially direct acoustical coupling between the loudspeaker and the microphone. The controller is also responsive to the information signals from the output of the summing means, for detecting secondary signals resulting from signals arriving at the microphone from the loudspeaker via a substantially indirect acoustical coupling being of greater length than the more direct acoustical coupling. The controller accordingly varies the set amount of attenuation in direct proportion to a subsonic average of the secondary signal.

BRIEF DESCRIPTION OF THE DRAWINGS

An example of the invention is discussed with reference to the accompanying drawings in which.

DESCRIPTION OF THE PREFERRED EMBODIMENT

Figure 1:
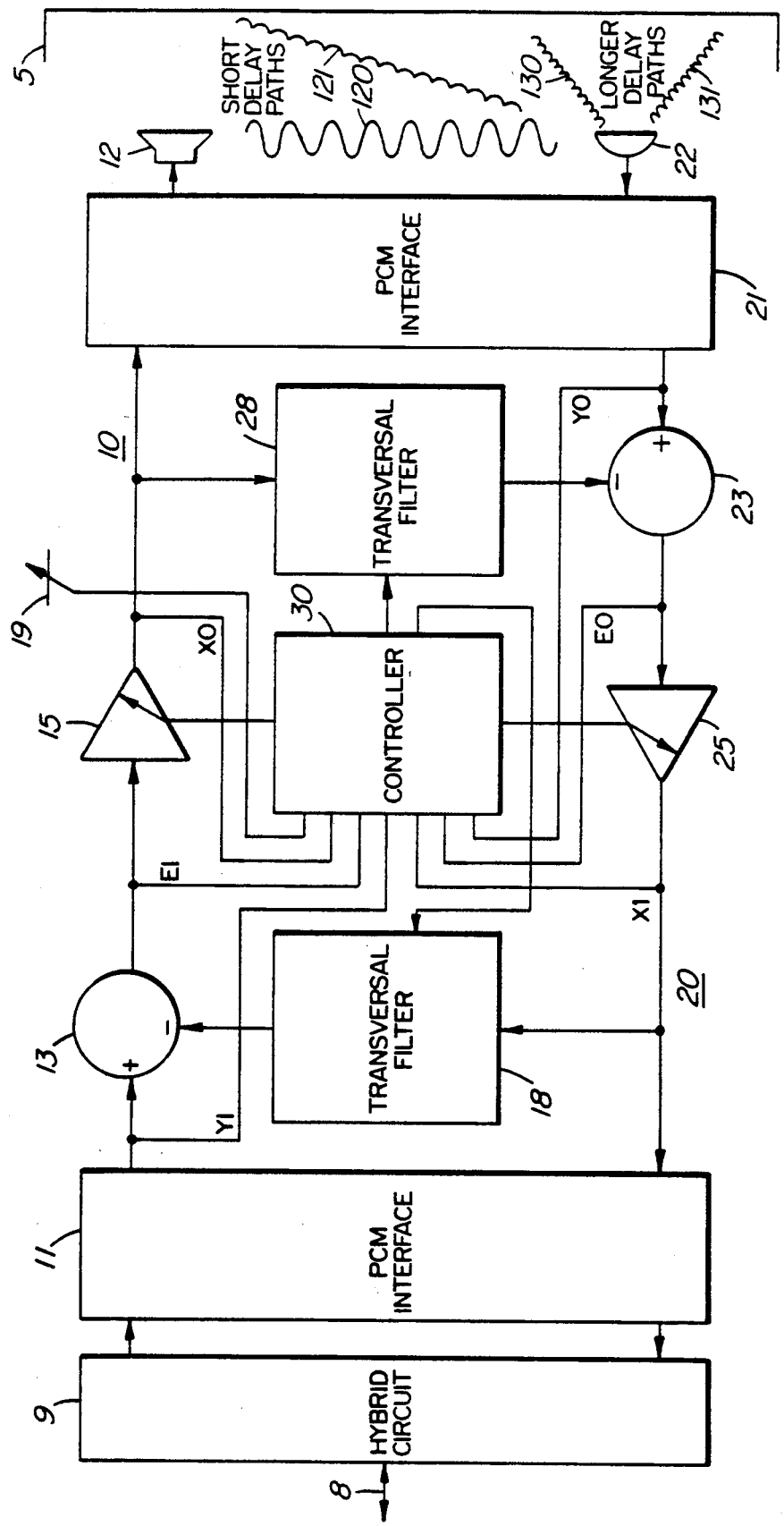
FIG. 1 is a block schematic diagram of a hands free communications terminal apparatus, in accordance with the invention.

The hands free communications terminal in FIG. 1 is shown to be situated in an indoors environment, as indicated by an abbreviated representation of a wall structure 5. The hands free communications terminal is also shown to be connected, for communicating with a remote location, to a typical two wire telephone line 8 via a hybrid circuit 9. However a pulse code modulated (PCM) signal interface 11, shown connected to the hybrid circuit 9, could just as easily be a digital signals access circuit connected with a digital link. A receive path 10 lies in an upper portion of the diagram and a transmit path 20 is illustrated in a lower portion of the diagram. The receive and transmit paths 10 and 20 are interfaced with a loudspeaker 12 and a microphone 22 via an analog to digital converter, not shown, and a digital to analog converter, not shown, within a PCM signal interface 21.

The receive path 10 includes a summing element 13 which includes a first input connected to an output of the PCM signal interface 11, a second input connected to an output of a transversal filter circuit 18, and an output connected to an input of a variable receive digital pad 15. An output of the variable receive digital pad 15 is connected to an input of the PCM signal interface 21. The transmit path 20 includes a summing element 23 which includes a first input connected to an output of the PCM signal interface 21, a second input connected to an output of a transversal filter circuit 28, and an output connected to an input of a variable transmit digital pad 25. An output of the variable transmit digital pad 25 is connected to an input of the PCM signal interface 11. A controller 30 is shown to have outputs being connected to control the operating parameters of the transversal filter circuits 18 and 28 and the variable receive and transmit digital pads 15 and 25. The control of the operating parameters is exercised by the controller 30 in accordance with program instructions which periodically evaluate signals in the transmit and receive paths 10 and 20 to provide the required hands free terminal operation discussed in more detail with reference to FIGS. 3a, 3b, 4a and 4b.

Figure 2:
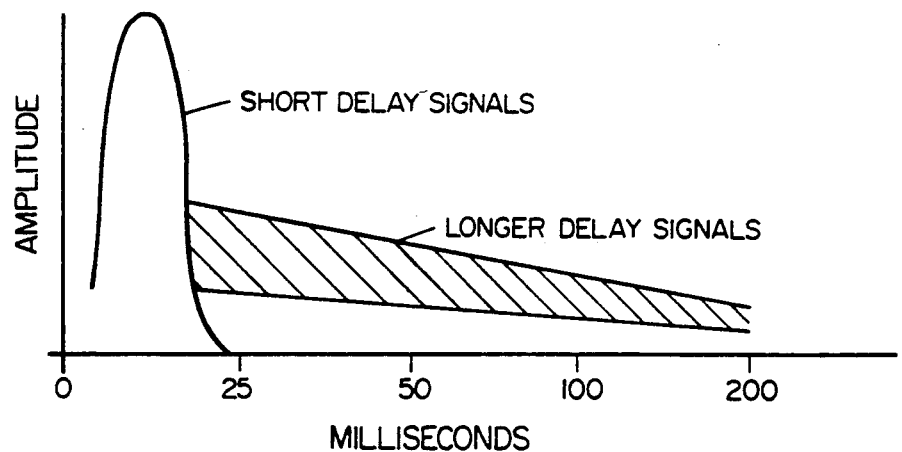
FIG. 2 is a graphical representation of sound energies which may be acoustically coupled from a receive path to a transmit path through an operating environment of 10 a hands free communications instrument as illustrated in FIG. 1.

In operation of the hands free terminal, the receive path 10 acoustically transmits into a gaseous medium via the loudspeaker 12, and the transmit path 20 acoustically receives from the gaseous medium via the microphone 22. Preferably the microphone 22 is a capacitance type transducer, for example an electret microphone, which is characteristically insensitive to mechanical vibrations while being directionally sensitive to sonic vibrations, for example speech utterances, in the gaseous medium. Unfortunately, microphones including electret microphones, are not source discriminating. Thus the transmit path receives unwanted signals both directly from the loudspeaker 12, and indirectly through reflections from various nearby objects. Likewise the hybrid circuit performance is less than perfect. FIG. 2 graphically exemplifies amounts of sound typically received at the microphone 22 after the corresponding sound has been transmitted from the loudspeaker 12. As may be seen in FIG. 2, most of the unwanted sound is picked up directly from the loudspeaker 12 within 25 milliseconds. The transversal filters 28 and 18 are operated in time regimes of about 24 milliseconds and 8 milliseconds respectively to reduce acoustical and electrical echo signals by injecting cancelling signals sufficient to prevent the hands free terminal unit from singing or oscillating. Fortunately sounds which are delayed more than about 20 milliseconds before being picked up from the loudspeaker 12 have in most cases been found to be of little effect or consequence as to the prevention of singing during a telephone conversation. However, if these more greatly delayed sounds are returned via the transmit path 20 and the telephone line 8, a far end party typically experiences an annoying echo. To prevent this, the variable receive and transmit digital pads 15 and 25 are operated in a complementary loss switching manner, to switch between transmit and receive modes such that when the far end party is talking, echoes not suppressed by the transversal filter 28 and the summing element 23 are attenuated by the transmit digital pad 25. Meanwhile, inherent disadvantages of voice switching are substantially reduced by varying the amount of loss through which the digital pads 15 and 25 are to be switched, generally in proportion to intensities of the longer delayed sounds, as exemplified in FIGS. 3a and 3b.

Figure 3A:
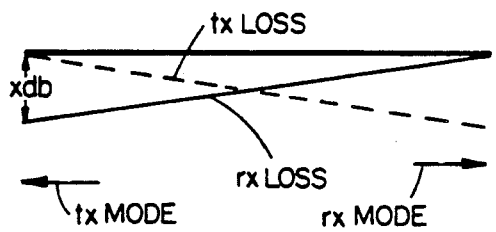
FIGS. 3a and 3b are graphical illustrations of relative amounts of loss switched between transmit and receive paths in a case of an acoustically soft environment and in a case of an acoustically hard environment respectively, during operation of the hands free communications terminal apparatus illustrated in FIG. 1.
Figure 3B:
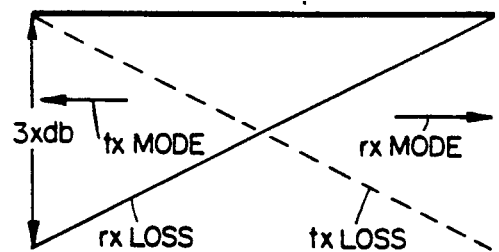
Figure 4A:
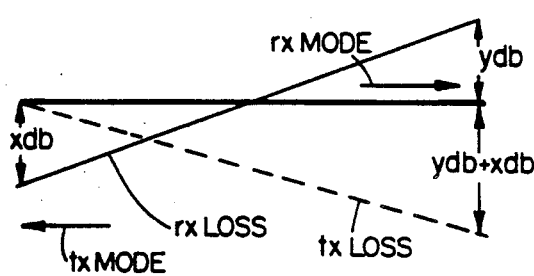
FIGS. 4a and 4b are graphical illustrations similar to those in FIGS. 3a and 3b, but wherein a user of the apparatus has adjusted the volume of the sounds from the receive path to increase the audibility of these sounds in the operating environment.
Figure 4B:
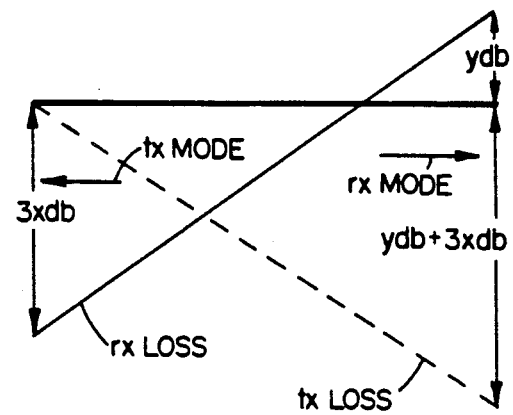

In FIG. 3a, a minimum amount of loss being switched is x decibels, where x is a value of about 6. This minimum amount of switched loss corresponds to operation in an almost echo free environment. In contrast, FIG. 3b is exemplary of operation in an acoustically hard environment where 3x decibels of loss is required to remove annoying echo from the transmit channel. FIGS. 4a and 4b correspond to FIGS. 3a and 3b with the exception that a user has manually adjusted a volume control mechanism, shown in FIG. 1, to decrease the loss in the receive channel by y dB during operation in the transmit mode to effect an increase in the volume of sounds from the loudspeaker. As illustrated, this also increases the loss in the receive channel by the same amount, y dB, during operation in the transmit mode.

More specifically, in the operation of the hands free communication terminal apparatus, digital pads 15 and 25, and the transversal filters 18 and 28 in combination with the summing elements 13 and 23, are the only elements that process PCM signals to produce other modified PCM signals. At 2 millisecond intervals the controller 30 takes six signal power value measurements: X0, Y0, E0, X1, Y1 and E1, from the transmit and receive paths 10 and 20. Logarithmic power levels, which represent signal power over the previous 4 milliseconds, are derived in dBm. At each 2 millisecond interval, the controller 30 updates Rx Gain and Tx Gain values, which directly control the amount of loss (or gain) inserted by each of these elements. The transmit and receive paths 10 and 20 are each operable over a range of from −40 dB to +24 dB. In the transmit path 20, loss of 40 dB corresponds to a mute state, which may be invoked by the user.

The digital pads 15 and 25 have nominal settings, Gain Tx Nom, and Gain Rx Nom, which indicate the gain values that would be used if no switched loss was required. Gain Rx Nom is manually adjustable by the user, by way of the volume control mechanism 19, which is connected to the controller 30.

During each 2 millisecond interval the controller 30 performs calculations that result in new values for Tx Gain and Rx Gain. Several intermediate calculations, which result in interval values stored in the controller 30 between intervals, are performed. These intermediate values, together with their initial values, are as follows:

Gain Tx Nom is set to approx 6 dB;
Gain Rx Nom is set to between −12 and +18 dB by the volume control 19;
X0F, Y0F and E0F are initialized at −70 dBm;
X1F, Y1F and E1F are initialized at −70 dBm;
Noise present in the room (E0N) and noise present on the telephone line (E1N) are initialized at 0 dBm;
An estimate of echo return loss between the loudspeaker 12 and the microphone 22, before echo cancellation is done, (OERLRx) and an estimate of echo return loss between the loudspeaker 12 and the microphone 22, after echo cancellation is done, (RERLRx) are each initialized to 6 dB;
Signal to noise ratio in the receive path 10 (SNRRx) and signal to noise ratio in the transmit path 20 (SNRTx) are each initialized to 42 dB; and
Switching loss (Sw Loss) is initialized to 40 dB.

Calculation 1

Peak Tracking

The six input signal power values are filtered by an instantaneous rise, fast decay characteristic. The filtered value is decremented only if the signal power is less than the filtered value for a specific interval.

If X0 > = X0F

X0F = X0

X0 counter = 4 (an 8 millisecond interval)

Else

If X0 counter = 0

X0F = X0F − 0.2 dB (a 100 dB/sec decay rate)

Else

*X0 counter = X0 counter − 1*

Similarly for Y0, E0, X1, Y1, and E1, except that for X1, Y1 and E1, the counter variable is set to 16 (a 32 millisecond interval) instead of 4.

Calculation 2

Noise Power

The room noise (E0N) is estimated by filtering E0 by a slow rise, fast decay filter:

If E0 > = E0N

*E0N E0N + 0.006 dB (3 dB/sec)*

Else

*E0N E0N − 0.12 dB (60 dB/sec)*

Calculation 3

Echo Return Loss

The telephone line receive noise (EIN) is estimated with a similar calculation. Calculation 3 - Echo Return Loss An estimate of the echo return loss between loudspeaker and microphone (OERLRx) prior to echo cancellation is done by comparing X0F to Y0F. This calculation is done only when the voice detector senses receive speech.

If OERLRx > X0F − Y0F

*OERLRx = OERLRx − 0.006 dB (3 dB/sec)*

Else

*OERLRx = OERLRx + 0.024 dB (12 dB/sec)*

An estimate of the echo return loss between loudspeaker and microphone (RERLRx) after echo cancellation is done by comparing X0FD (the value of X0F from 12 intervals previous) to E0F. This calculation is done only when the voice detector has sensed receive speech for at least 24 milliseconds.

If RERLRx > X0FD − E0F

*RERLRx = RERLRx − 0.006 dB (3 dB/sec)*

Else

*RERLRx = RERLRx + 0.024 dB (12 dB/sec)*

Similar calculations are done to obtain estimates of the echo return loss of the telephone line before and after echo cancellation (OERLTx and RERLTx). The only difference is that Y0FD is the value of Y0F from 4 intervals previous, and that the calculations for OERLTx and RERLTx are done when the voice detector senses transmit speech (for at least 8 milliseconds for RERLTx).

Calculation 4

Signal to Noise Ratio

An estimate of the ratio of the loudspeaker signal to room noise (SNRRx) is calculated by comparing X0F to E0N. This calculation is done only when receive speech is detected.

If SNRRx > X0F − E0N $$SNRRx = SNRRx - 0.006 \ dB \ (3 \ dB/sec)$$

Else $$SNRRx = SNRRx + 0.024 \ dB \ (12 \ dB/sec)$$

A similar calculation is done to estimate the ratio of the transmit signal to the line noise (SNRTx). This calculation is done only when transmit speech is detected.

Calculation 5

Echo Suppression Loss

The amount of switched loss required to adequately suppress the room echo (Loss Rx) is calculated as follows:

$$Loss \ Rx = Gain \ Tx \ Nom + Gain \ Rx \ Nom + 36 \ dB$$

If the ratio of the loudspeaker signal to room noise (SNRRx) is less, that is used instead:

If SNRRx < Loss Rx

Loss Rx = SNRRx

The room echo return loss (RERLRx) is deducted:

$$Loss \ Rx = Loss \ Rx - RERLRx$$

The amount of switched loss required to adequately suppress the line echo not cancelled by the 8 millisecond transversal filter 18 (Loss Tx) is calculated similarly:

$$Loss \ Tx = Gain \ Tx \ Nom + Gain \ Rx \ Nom + 18 \ dB$$

If SNRTx < Loss Tx

Loss Tx = SNRTx $$Loss \ Tx = Loss \ Tx - RERLTx$$

Calculation 6

Switched Loss

The desired switched loss (Loss) is the maximum of Loss Rx and Loss Tx

If Loss Rx < Loss Tx

Loss = Loss Rx

Else

Loss = Loss Tx

The actual switched loss used (Sw Loss) is adjusted from its previous value towards the desired value:

If Sw Loss > Loss $$Sw \ Loss = Sw \ Loss - 0.024 \ dB \ (12 \ dB/sec)$$

Else $$Sw \ Loss = Sw \ Loss + 0.024 \ dB \ (12 \ dB/sec)$$

The value of the switched loss (Sw Loss) is the additional loss that must be distributed to the two digital pads 15 and 25 to subtract from the nominal gains Gain Tx Nom and Gain Rx Nom. The voice switching algorithm accomplishes this by detecting receive and transmit speech occurrences and applying the loss accordingly. For example, if receive speech but no transmit speech is detected, all the loss would be applied to the transmit side:

Rx Gain = Gain Rx Nom

Tx Gain = Gain Tx Nom − Sw Loss whereas, if transmit speech but no receive speech is detected, all the loss is applied to the receive side:

Rx Gain = Gain Rx Nom − Sw Loss

Tx Gain = Gain Tx Nom

We claim:

1. A hands free communication terminal apparatus including a receive path having a loudspeaker, for coupling signals from a far end party via a transmission medium to the loudspeaker, and a transmit path having a microphone, for coupling signals from a near end user via the microphone and the transmission medium to the far end part, the hands free communication terminal apparatus comprising:
a voice switch including a receive variable attenuator being connected in series with the receive path and a transmit variable attenuator being connected in series with the transmit path, the variable attenuators being operable to effect switchable transmit and receive modes of operation:
a first echo canceller being connected between the transmit and receive paths and being adaptive to respond to signals in the receive path for reducing amplitudes of corresponding delayed signals from the microphone in the transmit path; and
a controller being responsive to signals in the transmit and receive paths, for adapting the operation of the echo canceller, and being responsive to signals from the echo canceller in the transmit path and to signals in the receive path, for switching the voice switch between receive and transmit modes of operation.

2. A hands free communication terminal apparatus as defined in claim 1 wherein the first echo canceller is limited to reducing amplitudes of short delayed signals in the transmit path by an amount sufficient to avoid singing in response to corresponding signals in the receive path, and wherein the controller is operative to vary an amount of loss through which the voice switch is switched toward an amount of loss at which the presence of longer delayed signals in the transmit path may become apparent to the far end party.

3. A hands free communication terminal apparatus as defined in claim 1 wherein an amount of loss through which the voice switch is operable is variable at a subsonic rate by the controller whereby the amount of switched loss is reduced toward the long term delayed echoes becoming perceptible to the far end party and away from the operation of the voice switch being perceptible to either of the near end user and the far end party.

4. A hands free communication terminal apparatus as defined in claim 1 further comprising a second echo canceller being connected across the transmit and receive paths adjacent the transmission medium and being responsive to signals in the transmit path for reducing echoes of said signals in the receive path.

5. A hands free communication terminal apparatus as defined in claim 4 wherein an amount of loss through which the voice switch is operable is variable whereby the presence of longer delayed echoes may be made more or less apparent to the far end party.

6. A hands free communication terminal apparatus as defined in claim 4 wherein an amount of loss through which the voice switch is operable is variable at a subsonic rate by the controller, whereby the amount of switched loss is reduced toward the long term delayed echoes becoming perceptible to the far end party and away from the operation of the voice switch being perceptible to either of the near end user and the far end party.

7. A hands free telecommunications instrument, for use with a transmission medium, comprising:
   a receive path including an output terminal, the receive path being for carrying binary information signals received from the transmission medium to a loudspeaker via the output terminal;
   a transmit path including an input terminal, the transmit path being for carrying binary information signals transmitted from a microphone, via the input terminal, to the transmission medium;
   a voice switch means including transmit and receive variable attenuators within the transmit and receive paths respectively, for passing the received and transmitted information signals with variable attenuation;
   a controller being responsive to relative strengths of the received and transmitted information signals for controlling the transmit and receive variable attenuators to impede the information signals traversing either one of the variable attenuators, with a set amount of attenuation;
   a summing means including first and second inputs and an output, and being connected in series between the input of the transmit path and the transmit variable attenuator via the first input and the output respectively;
   an transversal filter having an input connected to the receive path and an output connected to the second input of the summing means, and in combination with the summing means being operable as directed by the controller and in response to the binary information signals in the receive path, to reduce signals in the transmit path resulting from a substantially direct acoustical coupling between the loudspeaker and the microphone;
   the controller also being operable for varying the set amount of attenuation in direct proportion to a subsonic average of signals arriving at the microphone from the loudspeaker via a substantially indirect acoustical coupling being of greater length and greater delay than that of the substantially direct acoustical coupling.

8. A hands free telecommunications instrument as defined in claim 7 wherein the transmission medium is a telephone line for carrying voice band analog signals, the transversal filter is a first transversal filter, and the summing means is a first summing means, the hands free telecommunications instrument further comprising:
   means for converting voice band analog signals from the telephone line to binary received information signals, and for converting binary transmitted information signals to voice band analog signals;
   a hybrid circuit means for coupling voice band analog signals from the converting means to the telephone line, and for coupling signals from the telephone line t the converting means with substantial attenuation of signals originally from the converting means;
   a second summing means including first and second inputs and an output, and being connected in series with the receive path between the converting means and the receive variable attenuator via the first input and the output respectively;
   a second transversal filter having an input connected to the transmit path and an output connected to the second input of the second summing means, and in combination with the second summing means being operable to reduce signals resulting from side tone coupling across the hybrid circuit means.

9. A hands free telecommunications instrument as defined in claim 7 wherein the transmission medium is a telephone line for carrying non-linearly encoded digital signal sample representations of periodically sampled analog signals, the hands free telecommunications instrument further comprising:
   a transmission medium coupling means for converting the sample representations received from the transmission medium to linearly encoded binary signal samples, and for converting signal samples from the transmit path to digital signal sample representations consistent with the nonlinearly of said encoded digital signal sample representations.

10. A method for operating a hands free communication terminal apparatus which has a receive path with a loudspeaker, for coupling signals from a far end party via a transmission medium to the loudspeaker, and a transmit path with a microphone for coupling signals from a near end user via the microphone to the transmission medium, the method comprising the steps of:
    echo cancelling signals from the microphone in the transmit path in response to signals in the receive path for reducing delayed appearances of said signals in the transmit path to produce echo cancelled signals in the transmit path;
    in response to signals in the transmit and receive paths, adapting the step of the echo cancelling whereby reduction of said delayed appearances of said signals in the transmit path is limited to signal appearances of short delay and whereby the reduction is sufficient to avoid singing; and
    in response to signals from the echo canceller in the transmit path, and to signals in the receive path, switching a receive variable attenuator and a transmit variable attenuator in a complementary manner between receive and transmit modes of operation.

11. A method for operating a hands free communication terminal apparatus as defined in claim 10 wherein an amount of loss through which the attenuators are switchable is varied toward an amount of loss at which the presence of longer delayed echoes may become audibly apparent to the far end party.

12. A method for operating a hands free communication terminal apparatus as defined in claim 10 wherein an amount of loss through which the voice switch is operable is variable at a subsonic rate in response to longer delayed echoes in the transmit path, whereby the amount of switched loss is reduced toward the long term delayed echoes becoming perceptible to the far end party and away from the operation of the voice switch being perceptible to either of the near end user and the far end party.

13. A method for audible hands free telecommunications via a transmission medium and a telephone instrument which includes a loudspeaker and a microphone, wherein sounds at the microphone include sounds from the loudspeaker acoustically coupled thereto via first paths with a time delay of up to about twenty milliseconds, and sounds from the loudspeaker acoustically coupled thereto via second paths with a time delay of more than about twenty milliseconds, the method comprising the steps of:
   (a) receiving receive signals at the telephone instrument from the transmission medium;
   (b) in response to the receive signals, producing audible sounds therefrom, via the loudspeaker;
   (c) in response to audible sounds in the room, generating transmit signals, via the microphone;
   (d) transmitting the transmit signals from the telephone instrument to the transmission medium;
   (e) before transmitting in step (d), echo cancelling the transmit signals with the receive signals;
   (f) in response to respective energies of the receive and transmit signals performing the respective steps (a) of receiving and (d) of transmitting with complementary losses being switched therebetween, a value of said complementary losses being less than that required to prevent singing were it not for the step (e) of echo cancelling.

14. A method for audible hands free telecommunications as defined in claim 13, wherein the step (e) of echo cancelling the receive signal with the transmit signal, is limited to a period of time being substantially of about that of the time delay of the first paths, and comprising the further step of:
   (g) adjusting said value of said complementary losses in proportion to sounds coupled to the microphone from the loudspeaker and having a propagation time of more than said first period of time whereby the quality of said conversation approaches that of a conversation conducted via a full duplex telephone instrument while the last mentioned sounds are sufficiently attenuated to be substantially unnoticed.

15. A hands free communication terminal apparatus as defined in claim 1 wherein the controller is operable during a telephone call to reduce an amount of loss through which the voice switch is operable to an amount of loss which would be insufficient to prevent singing were it not for the function of the echo canceller.

* * * * *